United States Patent [19]

Steigerwald

[11] 4,346,431
[45] Aug. 24, 1982

[54] FIELD CONTROLLED THYRISTOR SWITCHING POWER SUPPLY

[75] Inventor: Robert L. Steigerwald, Scotia, N.Y.

[73] Assignee: General Electric Company, Schenectady, N.Y.

[21] Appl. No.: 224,599

[22] Filed: Jan. 12, 1981

[51] Int. Cl.³ .............................................. H02M 3/315
[52] U.S. Cl. ..................... 363/27; 363/124; 323/222; 307/252 R
[58] Field of Search ............ 323/222, 223, 325, 351, 323/267; 363/27, 28, 59–62, 124, 135; 307/252 R, 252 A, 252 C, 252 M, 305

[56] References Cited

U.S. PATENT DOCUMENTS

| | | | |
|---|---|---|---|
| 3,019,355 | 8/1959 | Morgan | 307/88.5 |
| 3,621,362 | 11/1971 | Schwarz | 363/27 |
| 3,629,673 | 12/1971 | Thorborg | 363/124 X |
| 3,835,364 | 9/1974 | Van Rooy | 363/28 |
| 4,245,285 | 1/1981 | Weiss | 323/222 X |

FOREIGN PATENT DOCUMENTS

| | | | |
|---|---|---|---|
| 242982 | 9/1969 | U.S.S.R. | 323/222 |
| 463959 | 10/1975 | U.S.S.R. | 323/351 |

OTHER PUBLICATIONS

Houston et al. "A Field Terminated Diode", IEEE Transactions on Electron Devices, Vol. ED-23, No. 8, Aug. 1976, pp. 905–911.

*Primary Examiner*—William M. Shoop
*Assistant Examiner*—Peter S. Wong
*Attorney, Agent, or Firm*—William H. Steinberg; James C. Davis, Jr.; Marvin Snyder

[57] ABSTRACT

A field controlled thyristor or a field terminated diode is used in a gate assisted turn off mode in a resonant circuit commutated switching dc/dc converter to convert power from one voltage level to another voltage level. A diode allows energy trapped in stray inductances to be delivered directly to the load rather than be dissipated in snubber resistors.

4 Claims, 6 Drawing Figures

FIELD CONTROLLED THYRISTOR SWITCHING POWER SUPPLY

This invention relates to switching power supplies and more particularly to resonant circuit commutated switching dc-dc converters.

There are many applications for changing one dc voltage to another. Some applications include power converters for armature voltage control of dc motors, converting low or high battery source voltages to levels which best match load requirements and controlling dc power for a wide variety of industrial processes.

Snubbers are required in switching power supplies to protect switching devices from voltage overshoots during turn off and to dissipate energy associated with current discontinuities. At high switching frequencies (over 20 KHz) which are desirable to reduce the size of the components required, the energy dissipated by the snubbers can be significant.

It is an object of the present invention to provide a dc-dc converter that has near zero turn on and turn off switching losses, as well as no snubber losses, that is capable of operating at and above 20 KHz.

SUMMARY OF THE INVENTION

Briefly, in accordance with one embodiment of the invention, a switching device having a low forward voltage drop and high dv/dt capability such as a field controlled thyristor or a field terminated diode is used in a gate assisted turn off mode in a resonant circuit commutated switching dc-dc converter level. A diode allows energy trapped in stray inductances during switch turn off to be delivered directly to the load rather than be dissipated in a snubber resistor. The switching device is connected at one end between a commutating inductor and an energy storage inductor to obtain near zero turn on switching losses.

In another embodiment, power is converted from a high voltage level to a low voltage level using a switching device having a low forward voltage drop and high dv/dt capability such as a field controlled thyristor or field terminated diode.

BRIEF DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

DETAILED DESCRIPTION OF THE INVENTION

Figure 1:
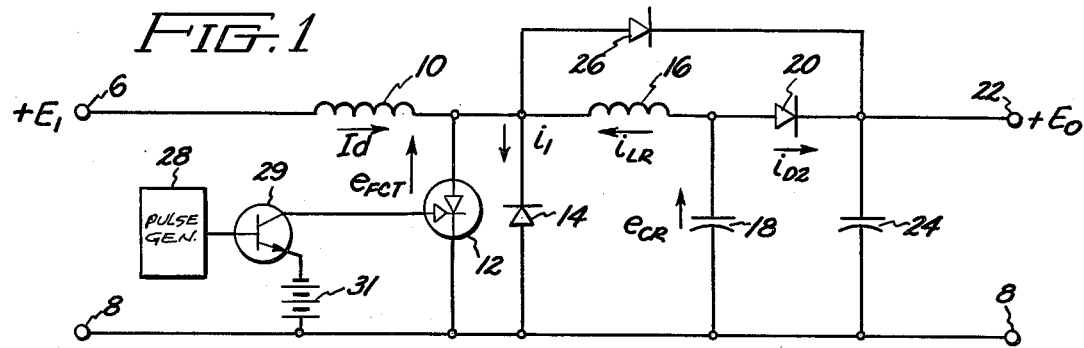
FIG. 1 is a part schematic part block diagram representation of a step up switching power supply in accordance with the present invention.

Referring now to the drawing and especially FIG. 1 thereof there is shown a switching power supply that converts a relatively low voltage source to a relatively high voltage output. A dc source input (not shown) can be connected to Lines 6 and 8. Line 6 is connected to one end of inductor 10, the other end of which is connected to the anode of a field controlled thyristor (FCT)12. Line 8 is connected to the cathode of the FCT. Since the FCT is operated in the gate assisted turnoff mode, a field terminated diode (FTD) may also be used. The operation and design of FCT's and FTD's are described in the paper of D. Houston et al. entitled "A Field Terminated Diode" published in IEEE Transactions on Electron Devices, Vol. ED-23, No. 8, August 76, pp. 905–911. Connected in parallel with the FCT is a diode 14 having its anode connected to line 8. A commutating inductor 16 and a commutating capacitor 18 are connected in series and across the FCT with the inductor connected to the anode of the FCT and the commutating capacitor connected to line 8. Connected between the commutating inductor and the commutating capacitor is the anode of diode 20. The cathode of diode 20 is connected to a line 22. A filter capacitor 24 is connected to the cathode of the FCT and the cathode of the diode is connected to line 22. A load (not shown) can be connected between line 22 and line 8. A pulse generator 28 supplies pulses to the gate of the FCT.

Figure 2:
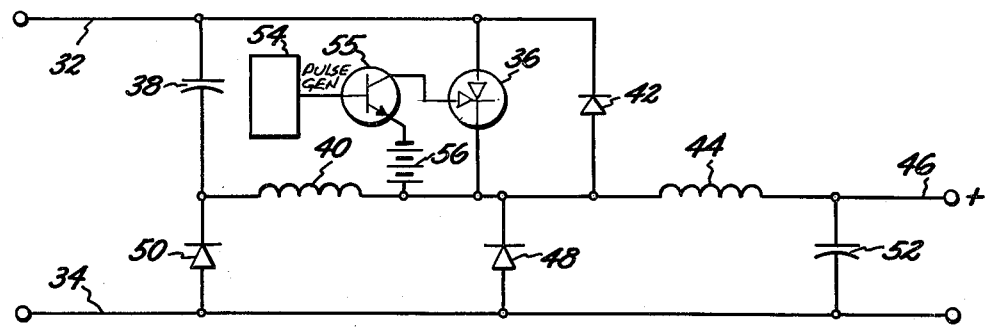
FIG. 2 is a part schematic part block diagram representation of a step down switching power supply in accordance with the present invention.

Referring now to FIG. 2, a switching power supply having a step down voltage ratio is shown. A dc source (not shown) can be connected to lines 32 and 34. Line 32 is connected to the anode of a field controlled thyristor (FCT) 36. The FCT is operated in the gate assisted turn-off mode, therefore, a field terminated diode (FTD) may also be used. A commutating capacitor 38 and a commutating inductor 40 are connected in series. The capacitor 38 is connected to line 32 and the inductor 40 is connected to the cathode of FCT 36. Connected in parallel with the FCT is a diode 42 having its anode connected to the cathode of the FCT and its cathode connected with the anode of the FCT. An inductor 44 is connected between the cathode of the FCT and Line 46. The cathode of diode 48 is connected between inductor 40 and inductor 44. The anode of a diode 48 is connected to line 34. The cathode of a diode 50 is connected between capacitor 38 and inductor 40. The anode of diode 50 is connected to line 34. Connected between line 46 and line 34 is a filter capacitor 52. A load (not shown) can also be connected between line 46 and line 34. A pulse generator 54 provides pulses to transistor 55 which connects the negative voltage source 56 to the gate of FCT 36.

Figure 3A:
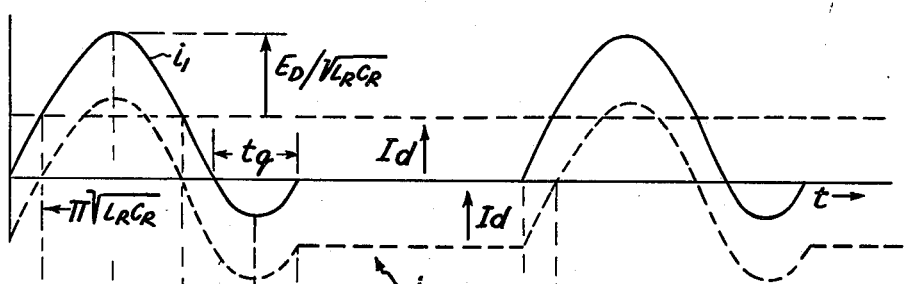
FIGS. 3A, B, C and D are waveform diagrams helpful in explaining the operation of FIG. 1.
Figure 3B:
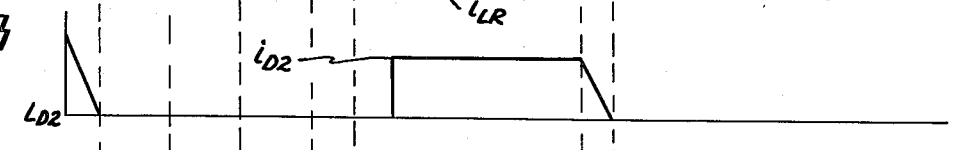
Figure 3C:
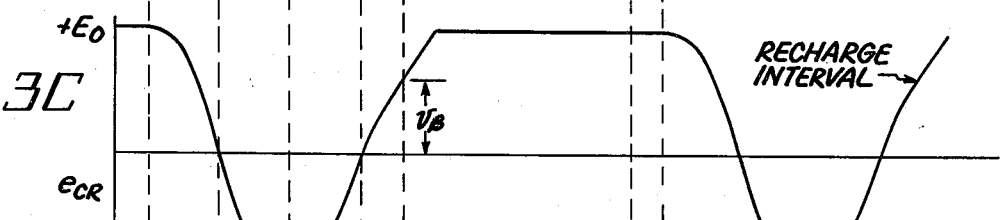
Figure 3D:
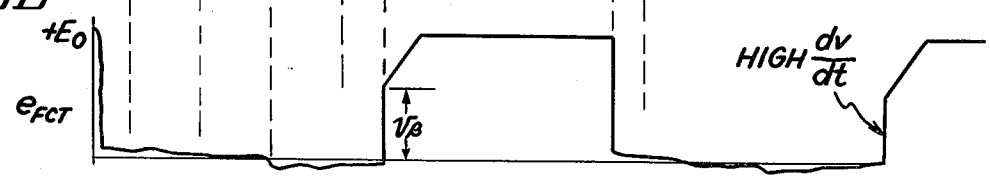

The operation of the circuit in FIG. 1 will be explained with reference to FIGS. 1 and 3A, B, C and D. FIG. 3A shows the current $i_1$ which is the sum of the current flowing in the FTD and diode 14. FIG. 3A also shows by dashed lines the current $i_{LR}$ which is the current flowing in commutating inductor 16 and the current $I_d$ which is the current through inductor 10. FIG. 3B shows the current $i_{D2}$ which flows through diode 20. FIG. 3C shows the voltage across the commutating capacitor 18. FIG. 3D shows the voltage across the FCT 12. Assuming the circuit is in operation and a negative voltage supplied by the pulse generator 34 has just been removed from the gate of the FCT allowing it to turn on, current begins to build linearly in inductor 10 storing additional energy in the inductor. Inductor 10 is an order of magnitude larger than inductor 16 and therefore changes in the current through inductor 10 cannot be readily seen at the scale used in FIG. 3A. Current just prior to the FCT turning one was through inductor 10, inductor 16 and diode 20 to the load. After the FCT turns on current through inductor 10 begins to flow in the FCT. Current in inductor 16 and diode 20 to the load decreases to zero. Diode 20 then becomes reverse biased, but high reverse diode stet current at diode turnoff is eliminated due to the soft commutation provided by inductor 16. Inductor 16 also allows the FCT anode voltage to fall to zero before substantial current builds up resulting in near zero turn-on switching losses. After diode 20 is reverse biased, the commutation circuit of inductor 16 and capacitor 18 begins to ring providing a half sine wave of current to the FCT which adds to the current provided by the dc power source through inductor 10. The voltage across commutation capacitor 18 decreases and then reverses and current in the commutating circuit rings back reducing the current flowing in the FCT. When the current ringing back in the commutating circuit exceeds the current provided by the dc power source through inductor 10, current stops flowing in the FCT and the reverse current is carried by diode 14. Sometime during conduction of diode 14, indicated by time $t_q$ in the waveform of FIG. 3A the gate of the FCT is pulled negative by a pulse from pulse generator 28 to transistor 29 which connects the negative voltage 31 to the gate of the FCT to clear charge in the vicinity of the gate and to prepare the FCT for the impending high dv/dt to be reapplied.

The on-time of the FCT is determined by the period of the commutating circuit and the current passing through inductor 10, but the gate of the FCT can be pulled negative at the commutating circuit's negative peak since the FCT is not conducting at this time for any current through inductor 10 that can be commutated off. It is also possible to monitor the FCT anode current for a zero crossing and pull the gate of the FCT negative at that time.

When current flowing in diode 14 reduces to zero, the voltage at the anode of the FCT (which is being held off) makes an immediate step in voltage to the value of the voltage at the output ideally in zero time (i.e. infinite dv/dt). This high dv/dt is normally snubbed by RC networks in SCR inverters with substantial losses at frequencies in the neighborhood of 20 KHz. In addition, before diode 14 recovers, reverse current is trapped in diode 14 and there will be a slightly higher current in inductor 10 than in commutating inductor 16 when diode 14 shuts off with a resulting high voltage overshoot. The energy associated with this discontinuity is also normally dissipated in RC snubbers. In the present invention, however, the FCT anode voltage is clamped by diode 26 and the excess energy stored in inductor 10 is delivered directly to the line 22 where it can be delivered directly to the load. After diode 14 is reverse biased, the commutating capacitor 18 recharges to a diode drop above the output voltage.

During the FCT and diode 14 off-time energy is delivered from the low voltage source to the filter capacitor and the load (not shown) through inductor 10, inductor 16 and diode 20. The current is maintained by virtue of the energy stored in inductor 10 and to a lesser extent to the energy stored in inductor 16.

The voltage delivered to the load by the step-up switching power supply is controlled by the ratio of on time to off time of the FCT. The pulse generator provides pulses with predetermined spacing and it is between pulses that the FCT is on. The duration of the pulses determine the ratio of on time to off time. To increase the output voltage, the ratio of on time to off time is increased and, to decrease the output voltage, the ratio of on time to off time is decreased.

The operation of FIG. 2 is similar to the operation of FIG. 1. Assuming the circuit in FIG. 2 is operating and a negative voltage supplied by pulse generator 54 to turn on transistor 55 has just been removed allowing the FCT to turn on, current begins to build up linearly in inductor 44 storing energy in the inductor. Current flow just prior to the FCT turning on was around the loop formed by inductors 40 and 44, diode 50 and the parallel combination of capacitor 52 and the load. After the FCT turns on current begins to flow through the FCT and then through inductor 16. Current flowing in diode 50 and commutating inductor 40 decreases to zero. Diode 50 then becomes reverse biased but high reverse current at diode turnoff is eliminated due to the soft commutation provided by inductor 40. Inductor 40 allows the FCT cathode voltage to rise before substantial current builds up resulting in near zero turn-on switching losses. After diode 50 is reverse biased, the commutation circuit of inductor 40 and capacitor 38 begin to ring providing a half sine wave of current to the FCT which adds to the current provided by the dc power source (not shown) connected across lines 32 and 34. The voltage across commutating capacitor 38 decreases and then reverses and current in the commutating circuit rings back reducing the current flowing in the FCT. When the current ringing back in the commutating circuit exceeds the current provided by the dc power source, current stops flowing in the FCT and reverse current is carried by diode 42. Sometime during the conduction of diode 42, the gate of the FCT is pulled negative by a pulse from pulse generator 54 to clear charge in the vicinity of the gate and the prepare the FCT for the impending high dv/dt to be reapplied.

The on-time of the FCT is determined by the period of the commutating circuit and the current passing through the FCT from the power supply, but the gate of the FCT can be pulled negative at the commutating circuits negative peak since the FCT is not conducting at this time for any current supplied by the power source that can be commutated off. It is also possible to monitor the FCT anode current for a zero crossing and pull the gate of the FCT negative at that time.

When current flowing in diode 42 reduces to zero, the voltage at the cathode of the FCT (which is being held off) makes an immediate step in voltage to the value of the voltage at the output in zero time (infinite dv/dt). This high dv/dt is normally snubbed by RC networks in SCR inverters with substantial losses at frequencies in the neighborhood of 20 KHz. In addition, before diode 42 recovers, reverse current is trapped in diode 42 and there will be slightly higher current in inductor 44 than in commutating inductor 40 when diode 42 shuts off with a resulting high voltage overshoot. The energy associated with this discontinuity is also normally dissipated in RC snubbers. In the present invention, however, the FCT cathode voltage is clamped by diode 48 and the excess energy stored in inductor 44 is delivered directly to the load. After diode 42 is reversed biased, the commutating capacitor 38 recharges to the difference between the supply and the load voltage.

During the FCT and diode 42 off-time energy is delivered from inductor 44 and to a lesser extent from inductor 40 to the parallel combination of capacitor 52 and the load through a path completed by diode 50.

The voltage delivered by the load by the step down switching power supply is controlled by the ratio of the on-time to off-time of the FCT. The pulse generator provides pulses with predetermined spacing and it is between pulses that the FCT is on. The duration of the pulses determines the ratio of on-time to off-time. To increase the output voltage which can be no greater than the input voltage, the ratio of on-time to off-time is decreased.

While the present invention has been described with reference to two specific embodiments thereof, it will be obvious to those skilled in the art that various changes and modifications may be made without departing from the invention in its broader aspects.

What is claimed is:

1. A switching power supply providing power to an external load comprising:
   a field controlled thyristor (FCT);
   a first inductor;
   commutating means comprising a second inductor and a first capacitor for commutating off said FCT, said first and second inductor being in series with one another with one end of said FCT connected to the junction of said first and second inductor so that current builds up in said first inductor when said FCT is on;
   a first diode in parallel with said FCT being reversed biased when said FCT is on;
   a second diode to provide energy to said load when the voltage across said FCT jumps due to said first diode blocking current, said second diode having one end connected between said first and second inductances and the other end connected to said load;
   filter capacitor means connected across said load;
   a third diode connected to permit current to flow from said first inductor to said load when said FCT is off; and
   pulse generator means connected to the gate of said FCT for holding said FCT off when said FCT has been commutated off and for subsequently turning said FCT on.

2. A switching power supply for providing power at stepped up voltages to an external load, which comprises:
   a field controlled thyristor having an anode, a cathode and a gate;
   a first inductor;
   means for connecting said first inductor between said anode of said field controlled thyristor and the positive terminal of an external dc voltage source;
   a first diode;
   means for connecting said first diode in parallel with said field controlled thyristor, with the cathode of said first diode being connected to the anode of said field controlled thyristor and the anode of said first diode being connected to cathode of said field controlled thyristor and the negative terminal of said dc voltage source;
   a second diode;
   a second inductor;
   means for connecting said second inductor between said cathode of said first diode and the anode of said second diode;
   a third diode;
   means for connecting the anode of said third diode to the cathode of said first diode and for connecting the cathode of said third diode to the cathode of said second diode;
   a first capacitor;
   means for connecting said first capacitor between the anode of said second diode and said negative terminal;
   a second capacitor;
   means for connecting said second capacitor between the cathode of said second diode and said negative terminal;
   means for generating pulses coupled to the gate of said field controlled thyristor to hold said field controlled thyristor off when said second inductor and first capacitor commutate said field controlled thyristor off; and
   means for connecting the external load for said power supply between said cathode of said second diode and said negative terminal.

3. A switching power supply for providing power at stepped down voltages to an external load, which comprises
   a first capacitor;
   a first diode;
   means for connecting one end of said first capacitor in series with the cathode of said first diode, the other end of said first capacitor being connected to the positive terminal of an external dc voltage source, said anode of said first diode being connected to the negative terminal of an external dc voltage source,
   a field controlled thyristor having an anode, a cathode and a gate;
   a first inductor;
   means for connecting said first inductor between the junction of said first capacitor and said first diode and the cathode of said field controlled thyristor;
   a second diode;
   means for connecting said second diode in parallel with said field controlled thyristor with the cathode of said second diode being connected to the anode of said field controlled thyristor and said positive terminal of said external dc voltage source and the anode of said second diode being connected to the cathode of said field controlled thyristor;
   a second inductor;
   means for connecting said second inductor between the anode of said second diode and the positive terminal of said external load;
   a third diode;
   means for connecting said third diode between said anode of said second diode and said negative terminal with the anode of said third diode connected to said negative terminal;
   a second capacitor;
   means for connecting said second capacitor between said positive terminal of said external load and said negative terminal; and
   means for generating pulses coupled to the gate of said field controlled thyristor to hold said field controlled thyristor off when said first capacitor and said first inductor commutate said field controlled thyristor off.

4. The switching power supply of claims 1 or 2 or 3 wherein said field controlled thryistor is replaced by a field terminated diode.

* * * * *